United States Patent
Brown

(10) Patent No.: US 11,583,830 B2
(45) Date of Patent: *Feb. 21, 2023

(54) PROCESS FOR RECOVERY OF LITHIUM FROM BRINE

(71) Applicant: STANDARD LITHIUM LTD., Vancouver (CA)

(72) Inventor: Craig Johnstone Brown, Pickering (CA)

(73) Assignee: STANDARD LITHIUM LTD., Vancouver (CA)

( * ) Notice: Subject to any disclaimer, the term of this patent is extended or adjusted under 35 U.S.C. 154(b) by 229 days.

This patent is subject to a terminal disclaimer.

(21) Appl. No.: 16/895,783

(22) Filed: Jun. 8, 2020

(65) Prior Publication Data
US 2020/0298207 A1    Sep. 24, 2020

Related U.S. Application Data

(63) Continuation-in-part of application No. 16/410,523, filed on May 13, 2019, which is a continuation-in-part of application No. 16/224,463, filed on Dec. 18, 2018.

(Continued)

(51) Int. Cl.
*B01J 20/34*    (2006.01)
*B01D 15/08*    (2006.01)
(Continued)

(52) U.S. Cl.
CPC .......... *B01J 20/3433* (2013.01); *B01D 15/08* (2013.01); *B01D 61/22* (2013.01); *B01J 20/0211* (2013.01);
(Continued)

(58) Field of Classification Search
None
See application file for complete search history.

(56) References Cited

U.S. PATENT DOCUMENTS 4,400,305 A * 8/1983 Takeuchi ................ C02F 1/288
210/683
2008/0119350 A1* 5/2008 Chung ................... B01J 20/041
502/4
(Continued)

FOREIGN PATENT DOCUMENTS

| WO | WO 2017/020090 A1 | 2/2017 | |
| WO | WO-2017020090 A1 * | 2/2017 | ............. B01D 15/08 |
| WO | WO 2019/000095 A1 | 1/2019 | |

OTHER PUBLICATIONS

SDWF ("Ultrafiltration, Nanofiltration and Reverse Osmosis", pp. 1-6, accessed online on Dec. 23, 2020 at https://www.hinesburg.org/water-project/safewaterdotorg-info-nano-and-ultrafiltration-reverse-osmosis.pdf (Year: 2020).*

(Continued)

*Primary Examiner* — Clare M Perrin
(74) *Attorney, Agent, or Firm* — Birch, Stewart, Kolasch & Birch, LLP

(57) ABSTRACT

A process for recovery of lithium ions from a lithium-bearing brine includes contacting the lithium-bearing brine with a lithium ion sieve (where that LIS includes an oxide of titanium or niobium) in a first stirred reactor to form a lithium ion complex with the lithium ion sieve, and decomplexing the lithium ion from the lithium ion sieve in a second stirred reactor to form the lithium ion sieve and an acidic lithium salt eluate.

24 Claims, 8 Drawing Sheets

Related U.S. Application Data

(60) Provisional application No. 62/610,575, filed on Dec. 27, 2017.

(51) Int. Cl.
| | |
|---|---|
| *B01D 61/22* | (2006.01) |
| *B01J 20/02* | (2006.01) |
| *B01J 45/00* | (2006.01) |
| *C02F 1/28* | (2006.01) |
| *C02F 1/42* | (2006.01) |
| *C02F 1/68* | (2006.01) |
| *B01D 61/42* | (2006.01) |
| *B01J 8/08* | (2006.01) |
| *B01J 47/15* | (2017.01) |
| *C02F 101/10* | (2006.01) |

(52) U.S. Cl.
CPC ............ *B01J 20/3475* (2013.01); *B01J 45/00* (2013.01); *C02F 1/281* (2013.01); *C02F 1/42* (2013.01); *C02F 1/683* (2013.01); *B01D 61/42* (2013.01); *B01J 8/08* (2013.01); *B01J 47/15* (2017.01); *C02F 2101/10* (2013.01); *C02F 2209/06* (2013.01)

(56) References Cited

U.S. PATENT DOCUMENTS

| | | | |
|---|---|---|---|
| 2012/0318744 A1* | 12/2012 | Ma | B01J 20/327 |
| | | | 210/688 |
| 2013/0001168 A1* | 1/2013 | Kim | B01D 15/02 |
| | | | 210/252 |
| 2017/0298475 A1 | 10/2017 | Paranthaman et al. | |
| 2018/0133619 A1* | 5/2018 | Snydacker | C22B 3/42 |

OTHER PUBLICATIONS

Chen, C.-W., et al., "Lithium recovery With LiTi2O4 ion-sieves", Marine Pollution Bulletin, vol. 124, pp. 1106-1110, Feb. 13, 2017.

Chitrakar, Ramesh et al., "Lithium recovery from salt lake brine by H2TiO3", Dalton Transactions, vol. 43, pp. 8933-8939, Jun. 21, 2014.

International Search Report for Application No. PCT/CA2018/000240, dated Mar. 14, 2019.

Recepoglu et al., "Effect of Operational Conditions on Separation of Lithium from Geothermal Water by λ-MnO2 Using Ion Exchange-Membrane Filtration Hybrid Process", Solvent Extraction and Ion Exchange, Taylor and Francis, vol. 36, No. 5, 2018, pp. 499-512.

Written Opinion of the International Searching Authority for Application No. PCT/CA2018/000240, dated Mar. 14, 2019.

* cited by examiner

PROCESS FOR RECOVERY OF LITHIUM FROM BRINE

CROSS-REFERENCE TO RELATED APPLICATION

This application is a Continuation-In-Part of copending application Ser. No. 16/410,523, filed on May 13, 2019, which is a Continuation-In-Part of copending application Ser. No. 16/224,463, filed on Dec. 18, 2018, which claims the benefit of U.S. Provisional Application No. 62/610,575, filed Dec. 27, 2017, all of which are hereby expressly incorporated by reference into the present application.

BACKGROUND OF THE INVENTION

1. Field of the Invention

The present invention generally relates to methods for recovering ions from brine, and more particularly, to methods for recovering lithium ions from brine.

2. Description of the Background Art

As a result largely of the recent interest in the use of lithium ion batteries for electric vehicles and stationary electric power storage associated with renewable energy systems including from wind, solar, and tidal sources, the demand for lithium has increased substantially and may soon outstrip supply. There is potentially a large supply of lithium available in various sources, such as seawater, brines, geothermal fluids, and continental salt lakes. As used herein, "brine" and "brines" refer to these various lithium-containing solutions. To date, however, there have been few viable ways to recover the lithium from these sources without extensive concentration by evaporation, as the lithium concentrations in these resources are typically very low. In addition, the much higher concentration of other metal ions, such as sodium, potassium, calcium, and magnesium, interferes with recovery of the lithium.

Ion exchange is a well-known technology for recovery of low concentrations of metal ions from aqueous solutions. However, conventional ion exchange resins, such as strong acid cation exchange resins with sulfonic acid functional groups and chelating resins with iminodiacetate groups, have a higher preference for multivalent ions, such as calcium and magnesium, which may be present. Although the selectivity for lithium over other monovalent ions, such as sodium and potassium, may be similar, the presence of these competitive monovalent ions, which normally exist in great excess in brines, makes recovery of lithium unfeasible.

Inorganic ion exchange media, such as ionic sieves, based upon manganese, titanium, or other oxides, have been identified as potentially useful for recovery of lithium from brines where there exists high concentrations of competitive ions, such as calcium, magnesium, sodium, and potassium. These materials can be termed lithium ion sieves (LIS). LIS exhibit a high preference for lithium because the LIS exchange sites are so narrow that $Na^+$ (0.102 nm), $K^+$ (0.138 nm), and $Ca^{2o}$ (0.100 nm), which have ionic radii larger than $Li^+$ (0.074 nm), cannot enter the exchange sites. Although the ionic radius of the $Mg^{2+}$ (0.072 nm) ion is similar to the ionic radius of $Li^+$, a high amount of energy is required for the dehydration of magnesium ions to allow it to enter the exchange sites so that selectivity over $Mg^{2+}$ is maintained.

However, LIS have a number of disadvantages. First, they are weakly acidic in nature and, as a result, have reduced capacity at lower pH levels. Second, they are not stable in acid solutions since some of the components dissolve in acid. As they degrade, they lose capacity to take up lithium so that they must be replaced on a frequent basis. Replacing LIS represents a significant cost. Moreover, removal and replacement of the degraded LIS, when it is installed in a conventional column, is difficult and time consuming. Finally, LIS are synthesized as fine powders and, therefore, due to high pressure drop, cannot be used in fixed beds, as is done with conventional ion exchange resins. A number of attempts have been made to improve the form by, for example, granulation, foaming, membranes, fibers, and magnetization. However, when these powders are agglomerated into larger geometries, the kinetics are severely impaired as a result of blockage of the pores and active exchange sites by the binding agents, and, typically, lower surface area to volume/mass ratio with larger particle sizes.

For example, the reference, Chitrakar et al., "Lithium Recovery from Salt Lake Brine by $H_2TiO_3$," *Dalton Transactions*, 43(23), pages 8933-8939, Jun. 21, 2014 (hereinafter referred to as "Chitrakar"), relates to the synthesis, characterization, and laboratory evaluation of lithium selective adsorbents based upon metatitanic acid. However, Chitrakar does not mention an industrial process and does not discuss issues concerning solid/liquid separation or washing the brine and eluent from the adsorbent on an industrial scale. For example, adsorption tests in Chitrakar were conducted in beakers at an adsorbent solids concentration of 20 g/L, and elution tests with HCl were conducted at an adsorbent solids concentration of 10 g/L. Chitrakar does not disclose how to use the adsorbent on a continuous industrial scale. Specifically, the laboratory filtration used in the tests would not be applicable on an industrial scale.

As such, there is still a need to improve the method for recovering lithium from brine using lithium ion sieves that overcome the disadvantages above.

SUMMARY OF THE INVENTION

In one aspect, the present invention provides a process for recovery of lithium ions from a lithium-bearing brine by contacting the lithium-bearing brine with a lithium ion sieve for less than about one hour in a first mixed or stirred reactor to form a lithium ion complex with the lithium ion sieve and decomplexing the lithium ion from the lithium ion sieve in a second mixed or stirred reactor to form the lithium ion sieve and an acidic lithium salt eluate.

In one embodiment, a process for recovery of lithium ions from a lithium-bearing brine comprises contacting the lithium-bearing brine with a lithium ion sieve for less than about one hour in a first mixed or stirred reactor to form a lithium ion complex with the lithium ion sieve. Then, the process includes a step of decomplexing lithium ions from the lithium ion sieve in a second mixed or stirred reactor to form an acidic lithium salt eluate solution separated from the lithium ion sieve. The lithium ion sieve may comprise an oxide of titanium or niobium (e.g., metatitanic acid or lithium niobate).

The decomplexing may be performed by elution using an acid. A concentration of the acid may be maintained at a constant value through additions of said acid. The concentration of the acid should be less than 0.1 M and preferably at a pH of greater than 1 and less than 3 and most preferably at pH of about 2. An average contact time of the lithium ion complex with the lithium ion sieve and the acid may be less than 1 hour. The acid may be hydrochloric acid or sulfuric acid.

A pH of the first reactor may be maintained at a constant value through addition of an alkali. The pH may be maintained at the constant value of greater than 4 and less than 9 or greater than 6 and less than 8. The alkali may be sodium hydroxide (NaOH), ammonium hydroxide, potassium hydroxide, sodium carbonate, magnesium hydroxide, calcium hydroxide, or anhydrous ammonia. For example, the alkali may be sodium hydroxide at a concentration of less than 8% w/w.

More than 90% of the lithium ion sieves may have an average particle diameter of less than 40 μm and more than 90% of the lithium ion sieves may have an average particle diameter of greater than 0.4 μm. More than 90% by volume of particles of the lithium ion sieve may be less than 100 μm in diameter and greater than 0.5 μm in diameter. More than 90% by volume of particles of the lithium ion sieve may be greater than 0.5 μm in diameter. The process may further comprise the step of removing lithium ion sieves having an average particle diameter of less than 1 μm before contacting the lithium-bearing brine with the lithium ion sieve.

The process may further comprise the steps of separating the lithium ion complex with the lithium ion sieve from the brine with a solid/liquid separation device; and contacting the lithium ion complex with the lithium ion sieve with water before decomplexing in the second reactor. The process may also further comprise the steps of separating the lithium ion sieve from the acidic lithium salt eluate solution with a solid/liquid separation device; contacting the lithium ion sieve with water after decomplexing in the second reactor to obtain a regenerated lithium ion sieve and a dilute acid water wash; and adding the regenerated lithium ion sieve to the first reactor. This process may further comprise the step of dewatering the lithium ion complex with the lithium ion sieve to a moisture content of less than 90% by weight before decomplexing the lithium ion from the lithium ion sieve in the second reactor. This process may also further comprise the step of dewatering the regenerated lithium ion sieve before being added to the first reactor. The step of contacting the lithium ion sieve with water may comprise contacting the lithium ion sieve with sufficient water such that more than 50% of the lithium ion that has been decomplexed from the lithium ion sieve is washed from the lithium ion sieve prior to adding the regenerated lithium ion sieve to the first reactor. The step of contacting the lithium ion sieve with water may also comprise contacting the lithium ion sieve with water in more than one countercurrent stage such that more than 50% of the lithium ion that has been decomplexed from the lithium ion sieve is washed from the lithium ion sieve prior to adding the regenerated lithium ion sieve to the first reactor. The process may also further comprise the step of adding the dilute acid water wash and additional concentrated acid to the second reactor.

The first reactor may comprise ultrafiltration or microfiltration membranes. Air or other gas may be used to agitate contents of the first reactor. A flux rate through the ultrafiltration membrane or the microfiltration membrane may be greater than 30 LMH at transmembrane pressures of less than 30 kPa.

A concentration of the lithium ion sieve may be greater than 50 g/L or greater than 100 g/L.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to one of ordinary skill in the art from this detailed description.

BRIEF DESCRIPTION OF THE DRAWINGS

The present invention will become more fully understood from the detailed description given below and the accompanying drawings that are given by way of illustration only and are thus not limitative of the present invention. In the drawings, like reference numerals are used to indicate like features in the various views.

DETAILED DESCRIPTION OF THE INVENTION

Figure 1:
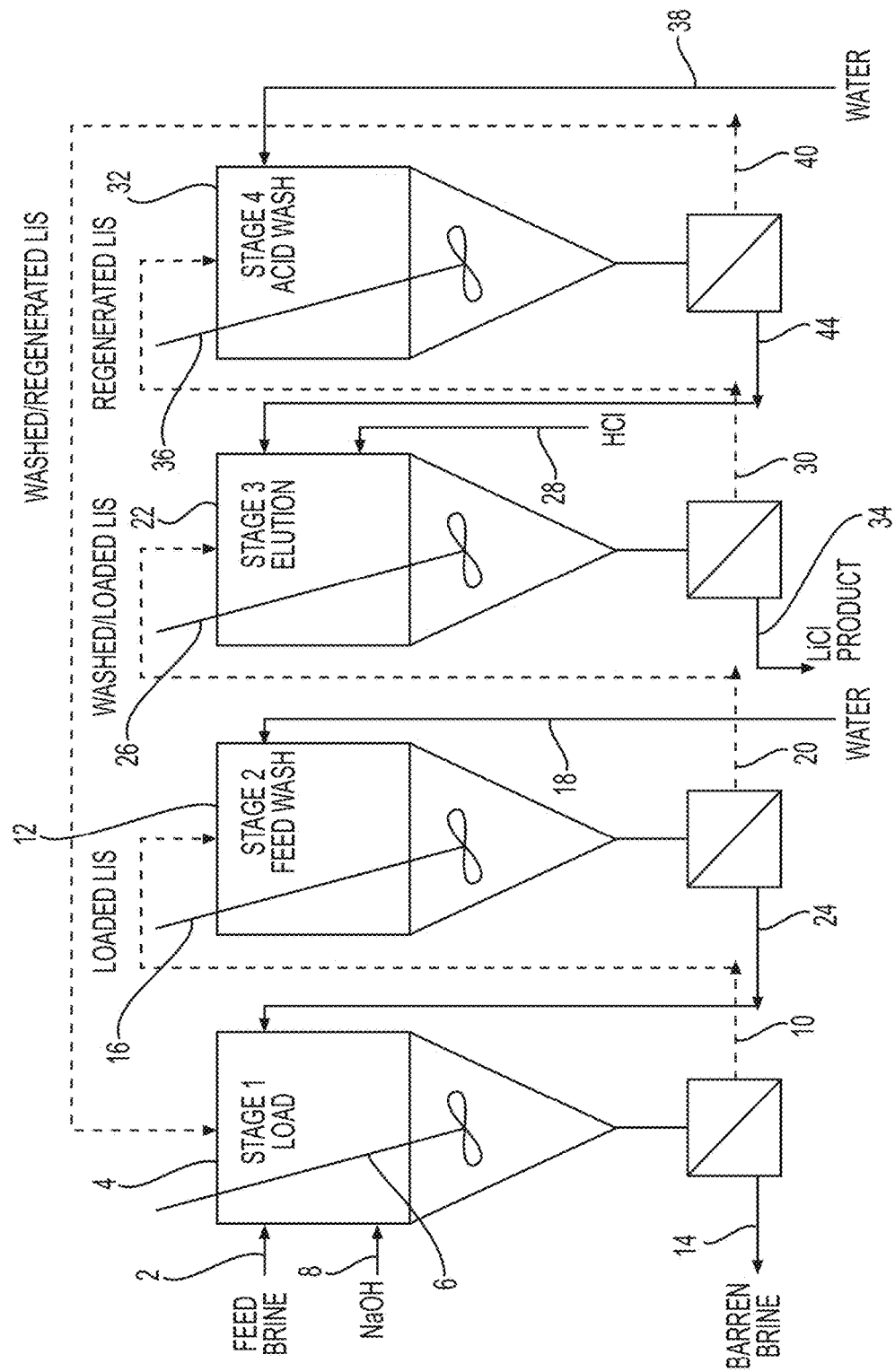
FIG. 1 is a diagrammatic view of an exemplary lithium extraction system for the present process.

As a result of the disadvantages discussed above, lithium ion sieves have not been applied widely to recovery of lithium from brine on an industrial scale to date. The present invention overcomes these disadvantages, making the use of lithium ion sieves for selective recovery of lithium from brine more commercially feasible.

The average particle diameter of conventional ion exchange resins is typically about 400-1250 micrometers. The RECOFLO® short bed ion exchange process utilizes what is normally considered the finest particles used in large-scale industrial applications. These particles typically have an average particle diameter of 100-200 micrometers.

By comparison, the lithium ion sieves utilized in the present invention are preferably in powder form. The average particle size of the powder does not necessarily have to be limited. However, the average particle size is preferably less than about 100 μm, more preferably 10 to 100 μm, even more preferably 20 to 100 μm, and yet even more preferably 20 to 95 μm. Further, the average particle size may be 0.4 to 40 μm. For instance, more than 90% (by volume) of the lithium ion sieve particles may be less than 100 μm in diameter and greater than 0.5 μm in diameter. In the same or different embodiments, more than 90% (by volume) of the lithium ion sieve particles may be greater than 0.5 μm in diameter. Since these materials are synthesized as powders, the cost of agglomeration is avoided. Moreover, the higher surface area afforded by such a powder significantly improves the kinetics of the ion exchange process. In other words, the lithium ion sieves are not a composite bound together with a polymer or other binding agent.

Various lithium ion sieves are potentially useful for lithium recovery. Exemplary LIS include, but are not limited to, oxides of manganese and titanium. Specifically, an exemplary LIS may include an oxide of titanium, preferably metatitanic acid (MTA). However, the present invention is equally applicable to other types of lithium ion sieve media such as manganese oxide and lithium niobate (i.e., niobic acid). The lithium ion sieve may also comprise doping agents in addition to an oxide of titanium, niobium, or manganese. However, the content of the lithium ion sieve would be predominately an oxide of titanium, niobium, or manganese.

In one embodiment of the present invention, the powdered lithium ion sieve media may be contacted with a lithium-containing brine in a stirred tank reactor (STR or reactor). For example, the reactor may be a tank containing the liquid to be treated along with the lithium ion sieve. The lithium ion sieve may be maintained in suspension by a mixer or by fluidization by upward liquid or gas bubble flow, which provides intimate contact between the lithium ion sieve and the brine. The pH of the brine in the reactor may be maintained at a constant level through additions of an alkali, such as sodium hydroxide (NaOH), ammonium hydroxide, potassium hydroxide, sodium carbonate, magnesium hydroxide, and calcium hydroxide. For example, the pH of the brine in the reactor may be maintained at greater than 5 and less than 9.

Many of the brines that can be treated with the present invention contain appreciable concentrations of magnesium. Neutralization of the brine with an alkali may present some problems for brines that contain high concentrations of magnesium. Although magnesium hydroxide does not normally precipitate below a pH of about 8, when the alkali is added, localized high pH conditions at the point where the alkali contacts the brine results in precipitation of magnesium hydroxide. Despite the fact that the pH of the bulk brine is below the theoretical precipitation pH, the precipitate does not quickly dissolve. The presence of magnesium hydroxide causes a number of problems. For example, it can adhere to the surface of the LIS, inhibiting uptake of lithium. If a membrane is utilized for solid/liquid separation, it can reduce the permeate flux and possibly foul the membrane.

When sodium hydroxide is utilized, the magnesium hydroxide precipitation problem is particularly acute and more pronounced at higher NaOH concentrations. When 50% w/w NaOH is utilized, large quantities of $Mg(OH)_2$ are produced that do not re-dissolve. If a more dilute NaOH solution is utilized, the quantity of $Mg(OH)_2$ produced is less and the $Mg(OH)_2$ re-dissolves more quickly. If 4% w/w NaOH is utilized, only very small quantities of $Mg(OH)_2$ are produced, which re-dissolve in just a few seconds. As such, if sodium hydroxide is used, the sodium hydroxide is preferably at a concentration of less than 8% w/w.

Use of dilute NaOH is disadvantageous in that it dilutes the barren brine. In locations where the barren brine must be re-injected under-ground, the resulting brine over-volume can be problematic, as more brine cannot be pumped back into the ground than was withdrawn.

This problem can be avoided by utilization of ammonia for neutralization. The ammonia can be in the form of anhydrous ammonia gas or liquid ammonium hydroxide so that the amount of brine over-volume is negligible. Only small quantities of $Mg(OH)_2$ precipitate out at the injection point, even if anhydrous ammonia gas or 30% ammonium hydroxide are used, and this precipitate re-dissolves quickly, having no negative impacts on the process.

After the ion exchange reaction has been completed, the lithium-depleted (i.e., barren) brine may be separated from the lithium ion sieve and removed from the reactor by various means. For example, the brine/lithium ion sieve slurry (i.e., loaded lithium ion sieve) may be contacted with water in an additional stirred reactor to remove residual brine before proceeding to the next step. Where the particle size of the lithium ion sieve is greater than about 10 microns, gravity sedimentation can be used. Where the particle size is less than 10 microns, filtration devices such as a rotary drum vacuum or belt filters can be used. Where the particles size is less than 1 micron, membrane filtration may be used. Combinations of these solid/liquid separation devices can be advantageously used. One example of a possible solid/liquid separation device may be a centrifuge.

After removal of the barren brine, the lithium ion sieve contained in the reactor may be contacted with an eluent. This eluent may be, among other things, an acid, such as hydrochloric acid (HCl) or sulfuric acid ($H_2SO_4$). For example, the acid may be added in a concentration in the order of less than 0.1 M, preferably at a pH of greater than 1 and less than 3 and most preferably at a pH of about 2. Without intending to be bound to any particular theory, it is believed that the acid elutes (decomplexes) the lithium from the LIS, thus producing a concentrated lithium salt product solution and regenerating the LIS. As used herein, a "complex" is a combination of individual atom groups, ions, or molecules that combine to create one large ion or molecule. As used herein, "decomplexing" is the act of separating individual atom groups, ions, or molecules from such a large ion or molecule. Because of the selectivity of the lithium ion sieve for lithium over other metals, the ratio of lithium to other metals may be appreciably higher in the product solution than the feed brine.

After the lithium ion sieve has been regenerated, the lithium ion sieve can be reused to treat more brine and extract more lithium.

In an embodiment of the invention, the process may be conducted continuously. Two reactor stages may be needed in such a continuous process. Brine may be fed continuously to a loading stage wherein lithium ion sieve is contacted with the brine as a continuously mixed slurry. Lithium ions may then be removed from the brine via uptake by the lithium ion sieve, resulting in the barren brine and a lithium-loaded LIS. The barren brine may then be separated from the lithium-loaded lithium ion sieve and removed from the reactor. The lithium-loaded lithium ion sieve, now separated from the brine, may be passed on to an elution stage.

Figure 8:
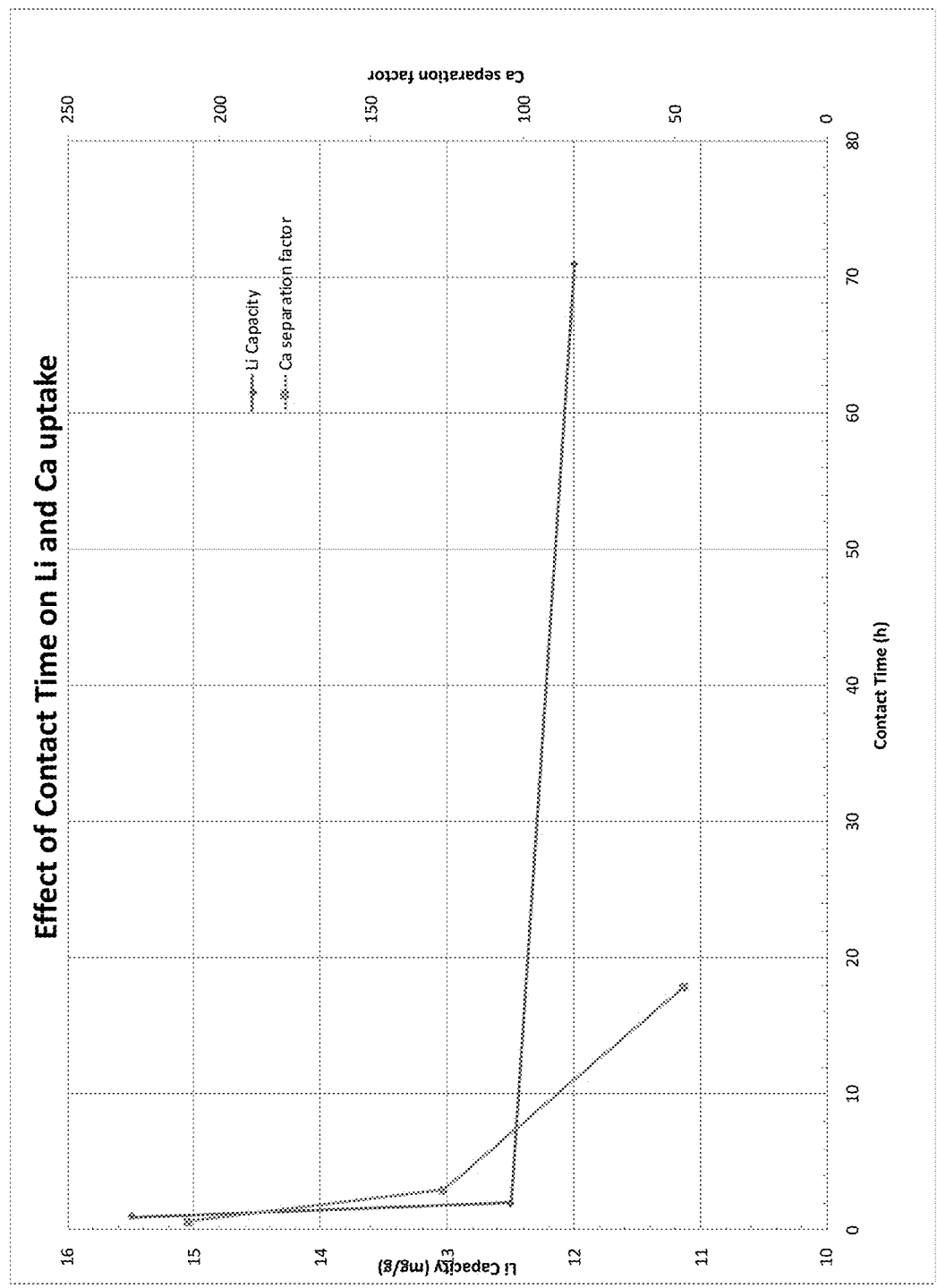
FIG. 8 is a graph showing the effect of contact time on lithium capacity and calcium separation.

Regarding the contact time between the brine and the lithium ion sieve, it is known that metatitanic acid lithium ion sieves have very poor kinetic properties. The lithium ions take a relatively long time to diffuse through the narrow exchange sites. One would therefore expect the amount of lithium taken up by the LIS to increase with increased contact time in the brine. In fact, FIG. 4(b) of Chitrakar shows the effect of contact time of LIS with brine. This data clearly shows that the amount of lithium taken up by the LIS increases with time and is what would normally be expected with any ion exchange sorbent. However, the effect of contact time on lithium uptake over time was found to have the opposite effect as shown in FIG. 8. Specifically, the lithium capacity decreases over time. As FIG. 8 shows, the lithium capacity decreased from 15.5 mg/g at 1 hour to 12.5 mg/g at 2 hours and further decreased to 12 mg/g after 71 hours. The Ca separation factor also decreases with contact time. More calcium and less lithium are taken up on the LIS as contact time increases. Perhaps given enough time, the larger calcium ions slowly diffuse to the narrow exchange sites and displace lithium. This phenomenon may not have been observed in Chitrakar since the brine of Chitrakar had a much higher lithium concentration and lower calcium concentration ([Li]=1630 mg/L, [Ca]=230 mg/L) than the brine typically used in the present invention. In FIG. 8, the brine used in the experiment had a lithium concentration of 219 mg/L and a calcium concentration of 34,500 mg/L. Thus, in order to maximize lithium capacity and calcium separation, at least for brines containing relatively high calcium and low lithium concentrations (e.g., brine obtained from the Smackover formation in southern Arkansas), the contact time between the LIS and the brine should be less than about 1 hour.

Eluent may be fed continuously to the elution stage, and the lithium-loaded lithium ion sieve removed from the loading stage may be contacted with the eluent as a continuously mixed slurry. The lithium ion sieve and liquid are separated, and this separated liquid (i.e., the eluate) is the lithium salt product solution.

The lithium content of the lithium ion sieve leaving the elution stage is appreciably reduced and, the lithium ion sieve may be recycled back to the loading stage for reuse. In this manner, the lithium ion sieve may be reused multiple times, and the process may be operated continuously.

In one embodiment, additional stages may be utilized as shown in FIG. 1. Specifically, a feed brine flows through a line 2 into a first stirred reactor 4, which contains lithium ion sieve, as part of a loading stage. The lithium ion sieve is maintained in suspension by a mixer 6. The brine/lithium ion sieve slurry is maintained at a constant pH through the addition of NaOH via line 8. The lithium ion sieve loaded with brine flows through line 10 into an additional stirred reactor 12 as part of a washing stage. The barren brine is separated from the loaded lithium ion sieve and flows through line 14. The lithium ion sieve loaded with brine is maintained in suspension by a mixer 16. In the washing stage, the loaded lithium ion sieve is contacted with water via line 18 to wash the brine from the lithium ion sieve, which is believed to reduce cross-contamination of the lithium salt product with contaminant ions present in the feed brine. The washed and loaded lithium ion sieve flows through line 20 into a second stirred reactor 22 as part of an elution stage. The wash water is separated from the washed and loaded lithium ion sieve and flows through line 24 to return to the first stirred reactor 4. The washed and loaded lithium ion sieve is maintained in suspension by a mixer 26. In the elution stage, the washed and loaded lithium ion sieve is contacted with HCl via line 28 to elute the lithium ions from the lithium ion sieve. The concentration of acid in the second stirred reactor 22 is maintained at a constant value through the addition of HCl via line 28. The regenerated lithium ion sieve flows through line 30 into another stirred reactor 32 as part of an acid wash stage. The lithium ions, as LiCl product, are separated from the regenerated lithium ion sieve and flow through line 34. The regenerated lithium ion sieve is maintained in suspension by a mixer 36. In the acid wash stage, residual acid is washed from the lithium ion sieve through the addition of water via line 38 so that the feed brine is not acidified in the loading stage when the lithium ion sieve is recycled and recovered lithium is not recycled back to the loading stage. The washed and regenerated lithium ion sieve flows through line 40 back to the first stirred reactor 4 to be used again in the loading stage. The dilute acid washings are separated from the washed and regenerated lithium ion sieve and flow through line 44 to be used along with the additional concentrated acid in the elution stage.

In one embodiment, several loading stages may be utilized in series and operated counter-currently. The brine may be initially processed in a first loading stage. The treated brine from the first loading stage, still containing some residual lithium, may be passed to a second loading stage wherein contact with lithium ion sieve further reduces the lithium content of the brine. The lithium ion sieve from the second loading stage, containing some lithium but still having further lithium capacity available, may be passed to the first loading stage. The loaded lithium ion sieve from the first loading stage may then be passed to an elution stage. By this means, the lithium content of the barren brine can be further reduced. To further reduce the lithium content of the barren brine, additional loading stages may be utilized in this manner.

The loaded lithium ion sieve can similarly be processed in several elution stages whereby the lithium ion sieve passes counter-currently to the eluate flow. By this means, the lithium content of the lithium ion sieve can be further reduced, and the lithium concentration in the eluate (i.e., the lithium product) can be increased.

The exchange reaction for uptake of the lithium ions onto the lithium ion sieve from the brine is shown in equation (1)

$$LIS.H + Li^+ \rightarrow LIS.Li + H^+ \qquad (1)$$

where LIS.H represents the lithium ion sieve in the freshly regenerated, hydrogen form and LIS.Li represents the lithium ion sieve in the loaded lithium form.

As the reaction proceeds, hydrogen ions are released to the brine, decreasing the pH of the brine. The active component of the lithium ion sieve may be, for example, an oxide of titanium, such as metatitanic acid (MTA). MTA is a weak acid and, therefore, has a high affinity for hydrogen ions. As a result, at a low pH, where hydrogen ions are available, MTA may not easily exchange hydrogen ions for lithium. The lithium ion sieve may also further comprise small amounts of doping agents.

Figure 2:
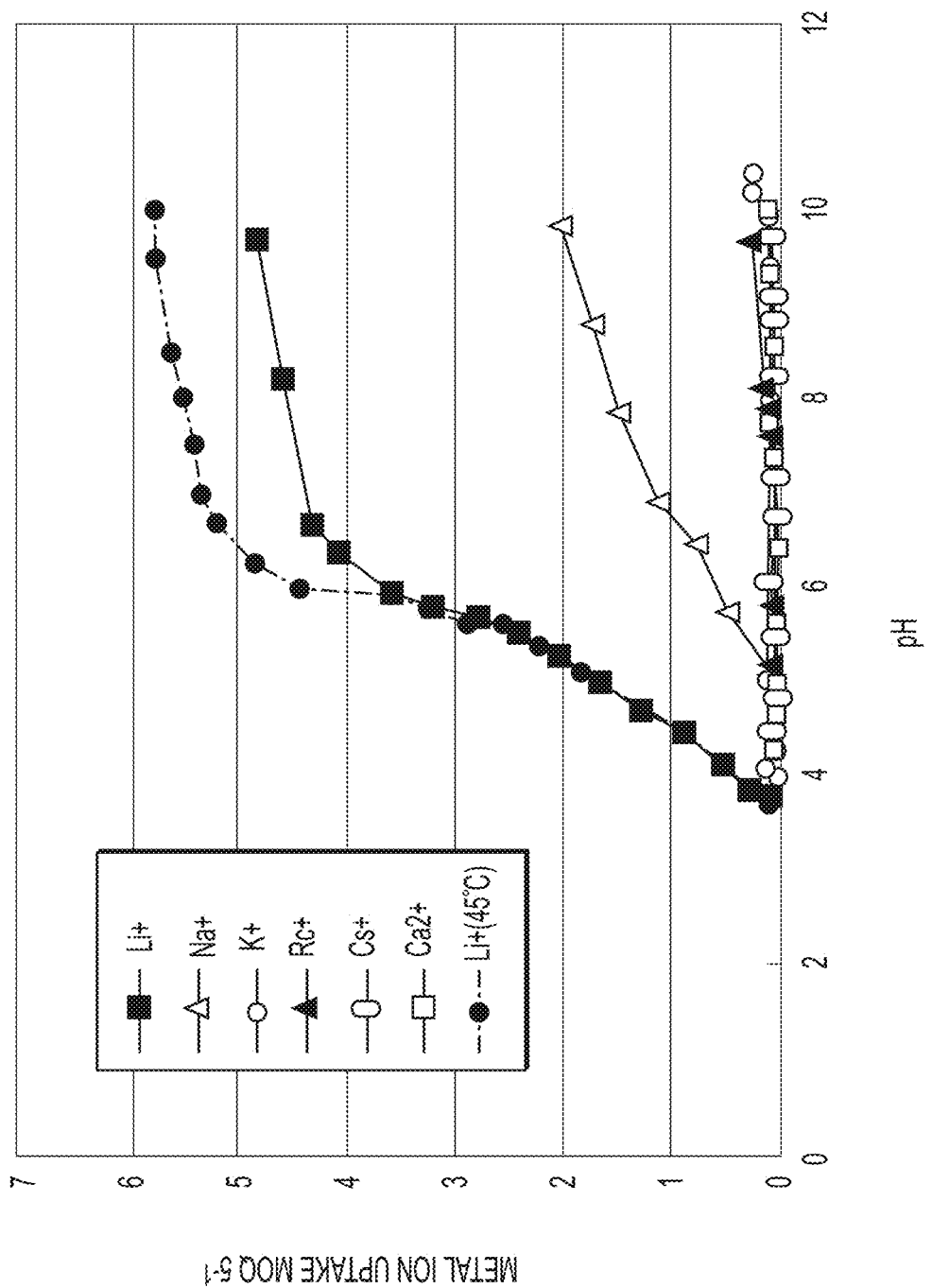
FIG. 2 is a graph showing the amount of metal ion uptake as a function of pH.

FIG. 2 shows the amount of metal ion uptake as a function of pH. It can be seen that lithium uptake is reduced significantly below a pH of about 6.5 and little lithium will be taken up below a pH of about 4. As the lithium loading proceeds, the pH of the brine drops. When the pH drops to a pH of about 4, no further uptake of lithium can occur.

This phenomenon is similar to that which is observed with conventional polymeric weak acid cation exchange resins. The conventional approach to dealing with this issue is to pre-neutralize the ion exchange resin with sodium hydroxide, which converts the exchanger to the sodium form so that, during loading, the pH of the solution remains constant. However, this approach will not work with a lithium ion sieve since the sodium ion is too large to penetrate the lithium ion sieve.

In one embodiment, the pH may be adjusted prior to contacting the brine with the LIS by dosing the brine with NaOH or another base, such as sodium carbonate or ammonium hydroxide, prior to treatment. Such a pre-treatment will raise the initial pH so that the final pH will not be so low as to prevent lithium uptake. The disadvantage of this approach, however, is that, as shown in FIG. 2, at increased pH levels the amount of sodium ions taken up by the lithium ion sieve increases. In addition, if the pH is raised above 8, magnesium hydroxide may precipitate out of solution.

In one embodiment, the brine/lithium ion sieve slurry in the loading reactor may be neutralized with an alkali, such as NaOH, in order to maintain the pH so as to maximize the uptake of lithium while minimizing the uptake of sodium. The pH may generally be greater than about 5 and less than about 9, preferably greater than 6 and less than 8. When the lithium ion sieve is MTA, the pH is preferably between 6 and 7.

Lithium is typically eluted from the LIS with an acid, such as hydrochloric acid, to concurrently regenerate the lithium ion sieve and produce a lithium product, as shown by equation (2). The lithium ion sieve effectively neutralizes the acid by this reaction.

$$\text{LIS.Li}^+ + \text{H}^+ \rightarrow \text{LIS.H} + \text{Li}^+ \qquad (2)$$

Figure 3:
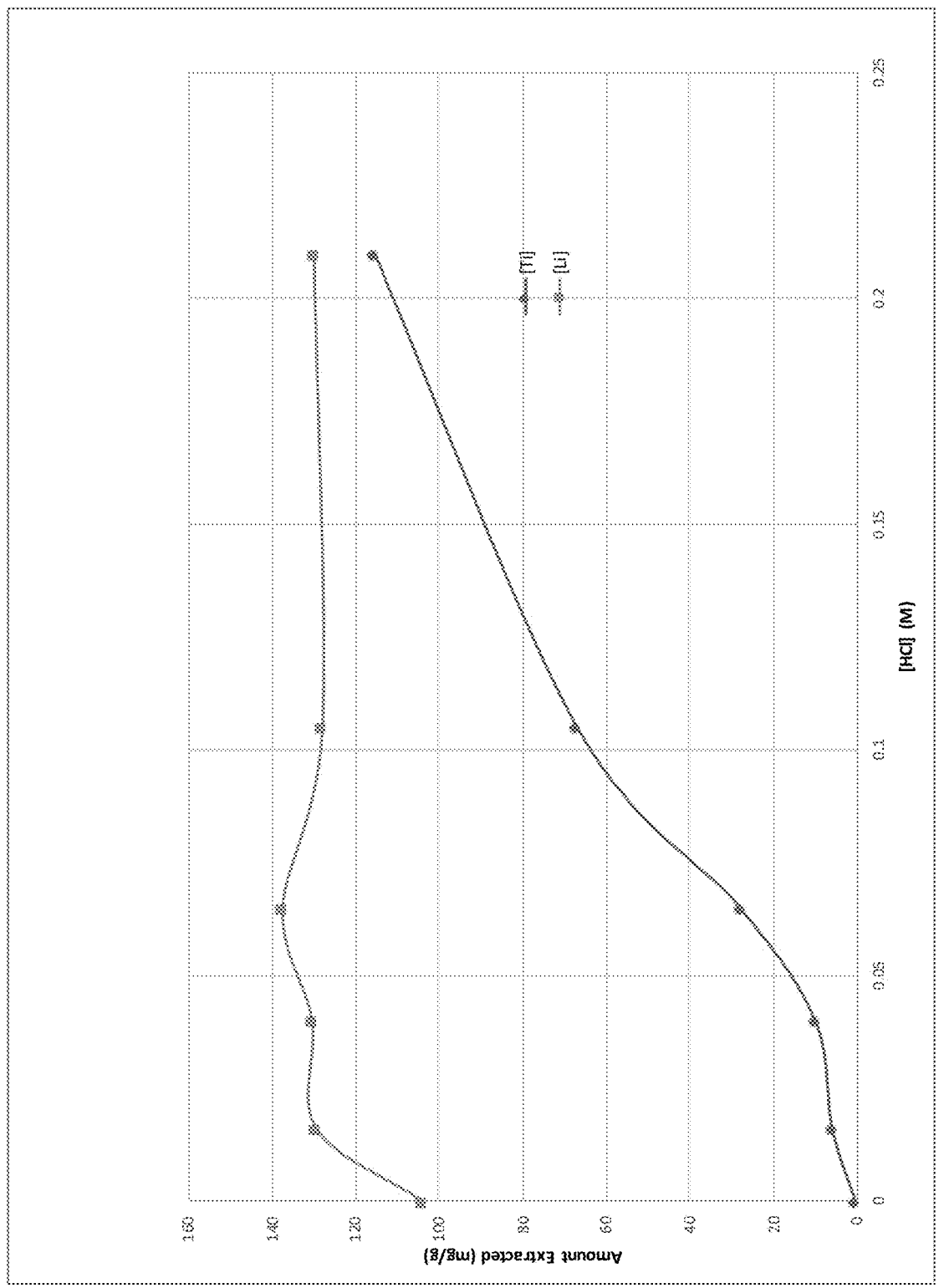
FIG. 3 is a graph showing the amount of lithium and titanium extracted as a function of hydrochloric acid concentration.
Figure 7:
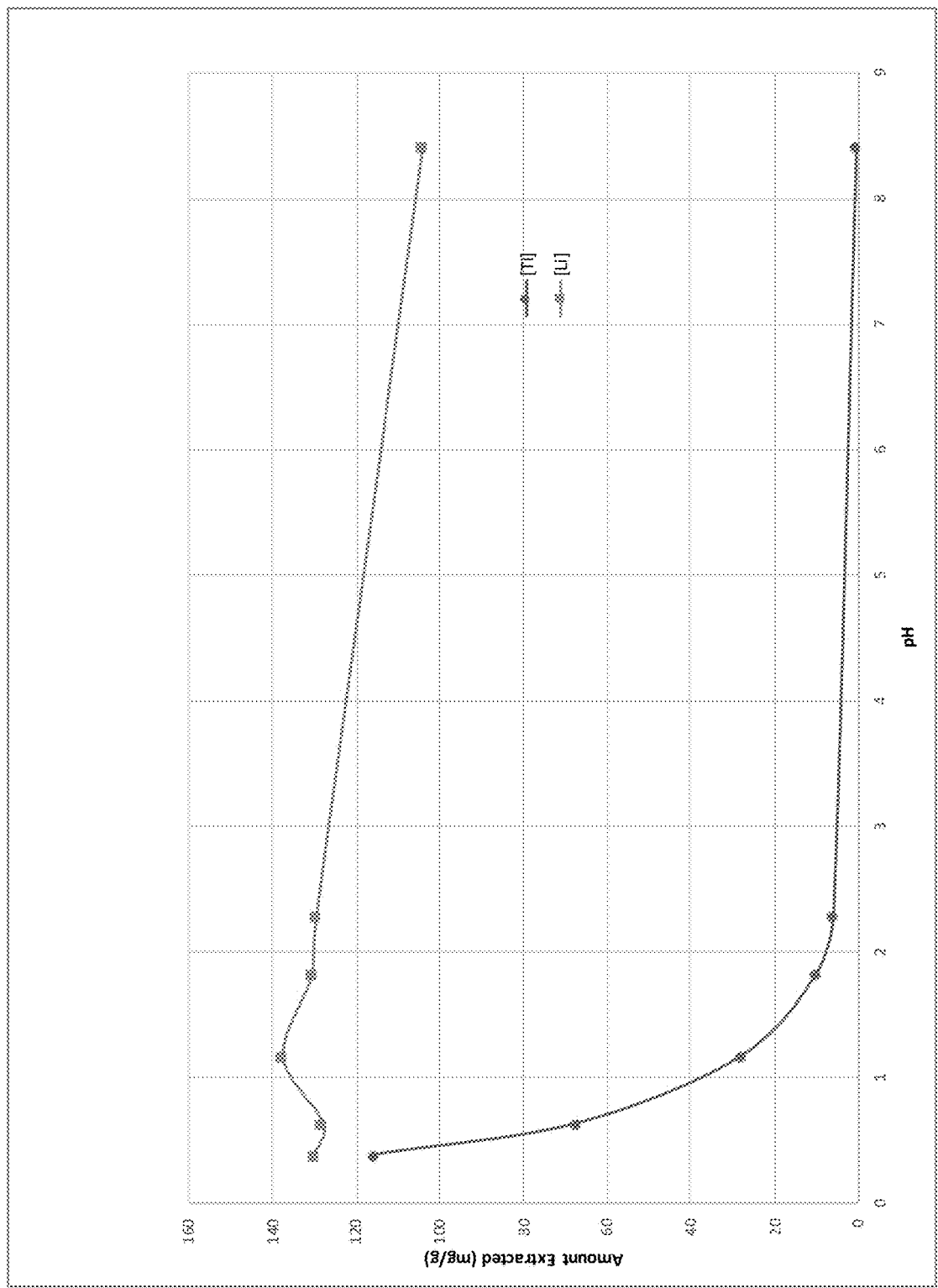
FIG. 7 is a graph showing the amount of lithium and titanium extracted as a function of pH.

As shown in FIG. 3, the amount of lithium eluted from the lithium ion sieve increases as the concentration of HCl increases. For optimum elution efficiency, the acid concentration may be maintained at a concentration of less than 0.1 M (defined as mol·dm$^{-3}$ in FIG. 3). As shown in FIG. 7, for optimum elution efficiency, the acid concentration may correspond to a pH of less than 3 and greater than 1 and preferably at a pH of approximately 2.

However, as also shown in FIG. 3, at acid concentrations of greater than 0.1 M, increasing amounts of titanium are extracted from the lithium ion sieve, thereby degrading the lithium ion sieve and reducing its useful life. Above an acid concentration of about 0.1 M, excessive amounts of titanium are extracted, resulting in a prohibitively short life.

One method to minimize such degradation of the lithium ion sieve is to minimize the contact time between the LIS and the acid. Because in one embodiment the lithium ion sieve is in powdered form, the kinetics of the ion exchange process are quite rapid and the exchange reaction of equation (2), above, is mostly completed in less than one hour. In an embodiment, the contact time between the LIS and the elution acid is less than one hour. Therefore, lithium is essentially completely removed from the lithium ion sieve while minimizing the degradation of the lithium ion sieve.

Figure 4:
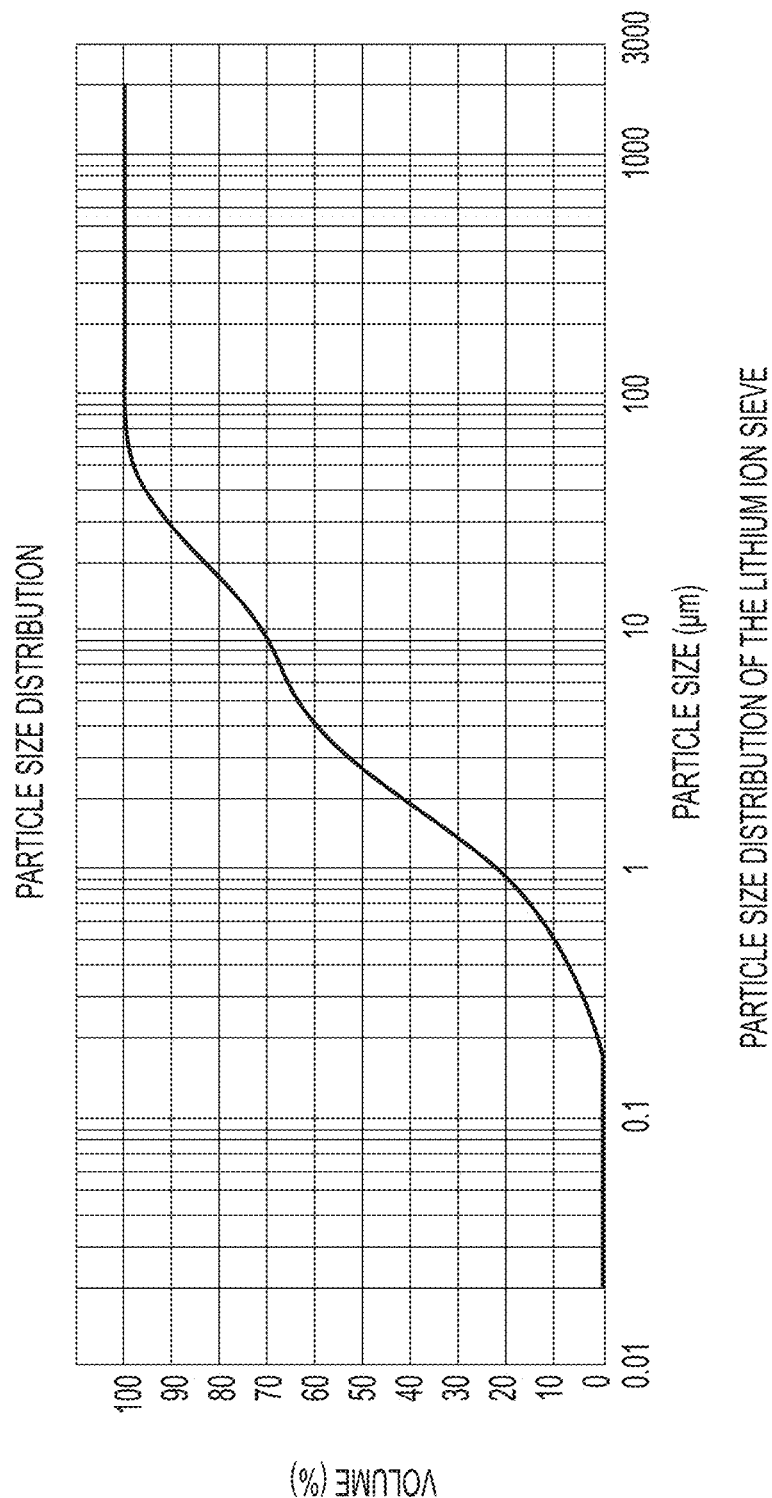
FIG. 4 is a graph showing an exemplary LIS particle size distribution of a sample of metatitanic acid lithium ion sieve taken after a few hours of air agitation in a slurry.

Additionally, the particle size of the lithium ion sieve particles plays a role in the design of the system described herein. FIG. 4 shows a typical particle size distribution of a sample of metatitanic acid lithium ion sieve taken after a few hours of air agitation in a slurry. The effective particle size ($d_{10}$) is about 0.5 µm and 90% (by volume) of the material is in the range of 0.4-40 µm. The effective size is the diameter of the particle for which 10 percent of the total grains are smaller, and 90 percent of the total grains are larger, on a weight or volume basis. The effective size of this material is about 0.5 µm. While the coarser material may settle from a water slurry by gravity in less than one hour, the finer particles do not easily settle even after a day. Without intending to be bound by any particular theory, it is believed that larger lithium ion sieve particles are agglomerates of fine particles produced by sintering during the synthesis process. As a result, the large particles are susceptible to mechanical attrition during mixing with the process liquids, so that there would be an increasing proportion of fine particles over time. Consequently, separation of the lithium ion sieve from the process liquids by gravity sedimentation is not ideal.

Membranes are being increasingly used in bioreactors for wastewater treatment. In a typical membrane bioreactor (MBR), microfiltration or ultrafiltration membranes with pore sizes of less than 0.1 µm, either in hollow-fiber, tubular or flat sheet form, are submerged in a suspension of wastewater and bio-solids. Clear filtered/treated wastewater is drawn through the membranes by vacuum. The wastewater/biosolids slurry is typically agitated by air sparging. Air agitation promotes oxygen transfer to the bio-solids and prevents membrane fouling due to build-up of bio-solids on the membrane surface.

In membrane bioreactors, the suspended solids concentration is typically less than 30 g/L and more typically 10-15 g/L. Higher suspended concentrations are not employed, as oxygen transfer is impeded due to resulting higher and non-Newtonian fluid viscosity. In addition, higher suspended solids concentrations reduce the membrane flux rate and/or increase the trans-membrane pressure. Typical flux rates for submerged membranes in membrane bioreactors are 10-30 liters per hour per square meter (which units are normally abbreviated as "LMH").

In one embodiment, the submerged ultrafiltration or microfiltration membrane process may be used in the present invention as a means of separating the lithium ion sieve from the process liquids. The pore size of the membranes, at typically less than about 1 µm, is smaller than the smallest lithium ion sieve particles, so nearly 100% solids separation can be achieved. In the present invention, oxygen transfer is not an issue. However, submerged aeration (air agitation) may provide the necessary mixing of the slurry, while the rising bubbles scour the membrane surfaces to reduce membrane fouling, and reduce the attrition and shearing of the LIS particles compared with mechanical mixing.

Embodiments described here are a significant departure from typical immersed membrane applications such as MBRs. Lithium ion sieve particles allow treatment of much higher suspended solids concentrations while achieving appreciable higher fluxes. Fluxes obtained in conventional MBR applications are typically less than 30 LMH at trans-membrane pressures of 10-30 KPa and total suspended solids (TSS) levels of less than 30 g/L. In contrast, with the present invention, fluxes as high as 300 LMH at transmembrane pressures of 20 KPa have been obtained with lithium ion sieves, at TSS levels of more than 100 g/L.

According to the present invention, the suspended solids concentration may be greater than about 50 g/L and preferably greater than 100 g/L. Without intended to be bound by any particular theory, it is believed that a higher solids concentration in the reactor is advantageous because it reduces the reactor volume required to achieve a given lithium ion sieve-liquid contact time.

In a fixed bed ion exchange system, the acid eluent becomes lower in acid concentration as it passes through the bed and is neutralized by the reaction provided by equation (2) above. In order to maintain the pH of the acid in contact with the lithium ion sieve at less than 3, to maintain elution efficiency, the pH of acid entering the bed may then be appreciably less than less than 1. Consequently, if the lithium ion sieve is regenerated in a fixed bed, the lithium ion sieve toward the entry end of the bed will be severely degraded by the more concentrated acid.

According to the present invention, the lithium ion sieve may be regenerated as a slurry in a reactor vessel where the lithium ion sieve is in contact with acid at a uniform concentration. The acid concentration may be maintained at a concentration of less than 0.1 M, and preferably at an acid concentration corresponding to a pH of less than 3 and greater than 1 and preferably at a pH of approximately 2. This concentration can be maintained by continuously measuring the acid concentration of the liquid in the reactor by suitable means and adding concentrated acid as required, to maintain the concentration in the desired range (e.g., at pH=2).

To minimize impurities, such as calcium, magnesium, potassium, and sodium, in the final lithium salt product produced by acid elution of the lithium ion sieve, the residual feed brine may be removed from the lithium ion sieve after loading and prior to acid elution by mixing the loaded lithium ion sieve with water and then separating out the water. In an alternative embodiment, the residual feed brine may be removed by directly filtering the loaded lithium ion sieve through a suitable filter. According to the present invention, the preferred particle size of the lithium ion sieve is in the range of 0.4-40 µm. Solids particles in this range can be filtered and de-watered using conventional solid/liquid separation devices, employing filter media, such as woven filter cloths with openings of greater than 10 µm in lieu of membranes with pore sizes of less than 1 µm. Thus, the bulk of the feed brine will be separated from the loaded lithium ion sieve. The dewatered lithium ion sieve may then be washed directly on the filter to remove the residual brine from the lithium ion sieve without the necessity of re-slurrying the lithium ion sieve in water. Exemplary types of filters include, but are not limited to, horizontal belt vacuum and pressure filters, rotary drum vacuum and rotary disk vacuum and pressure filters, pressure filter presses, and centrifuges.

As discussed above, elution of lithium from the lithium ion sieve with acid yields an acidic lithium salt solution. The lithium ion sieve is preferably separated from the acidic lithium salt eluate solution to minimize the return of the recovered lithium with the regenerated lithium ion sieve back to the loading reactor. A similar approach may be utilized as is used for separating feed brine from the loaded lithium ion sieve. Thus, the regenerated lithium ion sieve may be mixed with water and then separating out the water. Alternatively, the lithium ion sieve may be filtered through a suitable filter, preferably one with water washing capabilities.

Care should be exercised to minimize the moisture content of the lithium ion sieve transferred into the regeneration reactor. If excessive amounts of water accompany the lithium ion sieve into the regeneration reactor, the recovered lithium salt eluate solution will be too dilute. Similarly, the lithium should be recovered with the liquid entrained on the loaded lithium ion sieve that is withdrawn from the regeneration reactor.

As shown in Example 1 below, the working capacity of a metatitanic acid lithium ion sieve may be about 0.01 g lithium per gram of lithium ion sieve. The flow of lithium ion sieve on a dry basis would then be 100 g lithium ion sieve/g Li recovered. When the slurry in the loading reactor contains a suspended solids concentration of 100 g/L (i.e., about 90% moisture by weight and about 10% solids weight; 1 liter of water per 100 grams lithium ion sieve) and this slurry was transferred directly to the regeneration reactor, it would bring (1 g lithium ion sieve/0.01 g Li /100 g/L lithium ion sieve)=1.0 liter of water per gram of lithium recovered. Ignoring the water in the concentrated acid, the concentration of lithium in the eluate would then be 1 g/l.

If the suspended solids concentration in the regeneration reactor is also maintained at 100 g/L and withdrawn at this concentration, the amount of lithium entrained with the regenerated lithium ion sieve would be (1 liter/g Li×1 g/L Li)=1 g Li/g Li recovered. In other words, all of the lithium eluted from the lithium ion sieve would be withdrawn with the lithium ion sieve. If this lithium ion sieve was then recycled directly back to the loading reactor, no net lithium would be recovered.

The regenerated lithium ion sieve slurry could be mixed with water in a washing reactor to recover the lithium values prior to recycling the lithium ion sieve to the loading reactor. To separate 90% of the lithium from the lithium ion sieve would require 9 liters of water per gram of recovered lithium. The diluted liquid in the washing reactor could then be separated by gravity or a membrane, for example. The concentration of lithium would then be only 0.1 g/l. However, this concentration is too low to be of practical use.

Thus, the lithium ion sieve should be dewatered to a moisture content appreciably less than 90%.

For example, if the loaded lithium ion sieve slurry is dewatered to 50% moisture (i.e., 1 liter water/1000 g lithium ion sieve) the lithium ion sieve would carry only (1 liter water/1000 g lithium ion sieve)/(0.01 g Li/g lithium ion sieve)=0.1 liter water per gram of Li recovered. Ignoring the water in the concentrated acid, the concentration of lithium in the eluate would then be 10 g/liter.

Additionally, the regenerated lithium ion sieve should be dewatered when it is removed from the regeneration reactor. Otherwise, a large portion of the recovered lithium will be recycled with the lithium ion sieve back to the loading reactor. Even if the regenerated lithium ion sieve is dewatered to a high degree, the lithium lost to the moisture entrained in the lithium ion sieve may be problematic. For example, if the regenerated lithium ion sieve is dewatered to 50% moisture content by weight (i.e., 1 liter water per 1000 g of lithium ion sieve), the amount of lithium entrained with the lithium ion sieve would be (1 liter/1000 g lithium ion sieve)/(0.01 g Li/g lithium ion sieve)×10 g Li/1 L)=1 g Li/g Li recovered. In other words, all of the lithium eluted from the lithium ion sieve would be withdrawn with the lithium ion sieve. If this lithium ion sieve was then recycled back to the loading reactor, no net lithium would be recovered.

Thus, the lithium from the liquid entrained with the dewatered lithium ion sieve should be recovered. For instance, the regenerated lithium ion sieve may be washed with water. The lithium would then be recovered in the wash water. The amount of wash water should be sufficient to recover most of the lithium, but not so much as to excessively dilute the recovered lithium salt solution. One method to achieve this would be to re-slurry the lithium ion sieve in water and then re-filter the lithium ion sieve from the slurry. To wash 90% of the lithium from the lithium ion sieve would require about 9 mL of water per mL of entrained liquid in the lithium ion sieve, allowing recovery of a lithium salt solution containing 1 g/L lithium under these conditions.

The amount of wash water can be reduced and the lithium concentration can concomitantly be increased by utilizing two or more counter-current washes. Accordingly, the dewatered lithium ion sieve recovered from the first wash stage is re-slurried in water once again in a second wash stage and then dewatered yet again. The wash water recovered from the second stage dewatering device is utilized in the first wash stage in lieu of fresh water. With two counter-current wash stages, the amount of water required for 90% lithium recovery can be reduced from about 9 mL of water per mL of entrained liquid to about 3 mL of water per mL of entrained liquid, and the concentration of recovered lithium can be increased from 1 g/L to about 3 g/L.

In a further embodiment, the slurry may be dewatered by a device such as a horizontal vacuum belt filter. The dewatered lithium ion sieve cake may then be washed directly on the filter. One or more count-current wash stages can be employed on the filter. As another option, a centrifuge may be used. If a centrifuge is used, the solids may be re-slurried in water and then dewatered with the centrifuge. If several washing stages are used, the dewatered solids from a first centrifuge may be re-slurried with water again and then dewatered in a second centrifuge. The centrate from the second centrifuge may be used as the water to slurry the solids feeding the first centrifuge. Additional centrifuges can be utilized in this manner to effectively achieve a multi-stage countercurrent solids wash.

If the particle size of the lithium ion sieve is too small, such dewatering becomes more difficult. Indeed, even if the majority of the particles are greater than 10 micrometers in diameter, the presence of particles much less than 10 micrometers in diameter makes dewatering difficult. In particular, if the average particle size of the ion sieve is 0.1 µm or less, dewatering becomes virtually impossible.

In another embodiment of the present invention, the dry lithium ion sieve may be classified by a suitable device such as an air classifier or the wet lithium ion sieve may be classified by elutriation to remove the fine particles with a diameter of less than 1-10 micrometers. By doing so, separation of the lithium ion sieve from the liquid to be treated is facilitated. Removal of the fine particles will significantly improve filtration rates, avoid blinding of filtration media, and produce a filter cake with a lower moisture content. By removing the fine particles in this manner, conventional solid/liquid separation devices, such as horizontal belt vacuum and pressure filters, rotary drum vacuum and rotary disk vacuum and pressure filters, pressure filter presses, centrifuges, and the like may be more effectively employed.

To maximize the purity of the recovered lithium salt product, the feed brine should be efficiently separated from the loaded lithium ion sieve. Purity requirements for battery grade lithium carbonate, for instance, are very stringent. Any residual feed brine retained with the loaded lithium ion sieve will contaminate the product with impurities in the feed brine, such as calcium, magnesium, sodium, potassium, etc. As the concentration of these impurities in the brine is much higher than the lithium, even minimal amounts of brine carry-over are problematic. In fact, the impurity contribution from entrained brine on the loaded lithium ion sieve is potentially greater than the quantity of impurities actually exchanged on to the lithium ion sieve in most cases. While additional processes, such as lime/soda and ion exchange softening, can be used to purify the recovered lithium solution, these additional process steps involve additional capital and operating expense. However, efficient dewatering and washing of the loaded lithium ion sieve prior to passing it onto the regeneration reactor can minimize need for these costly processes. As discussed above, efficient dewatering can be achieved with conventional solids/liquid separation devices, provided that the lithium ion sieve does not have significant quantities of particles less than 1-10 micrometers in diameter. In addition, the wash water requirements can be reduced by employing multi-stage counter-current washing.

The present invention will hereinafter be described with reference to exemplary embodiments, which are written to be understood only as examples and are not intended to limit the scope of the present application.

EXAMPLE

Figure 5:
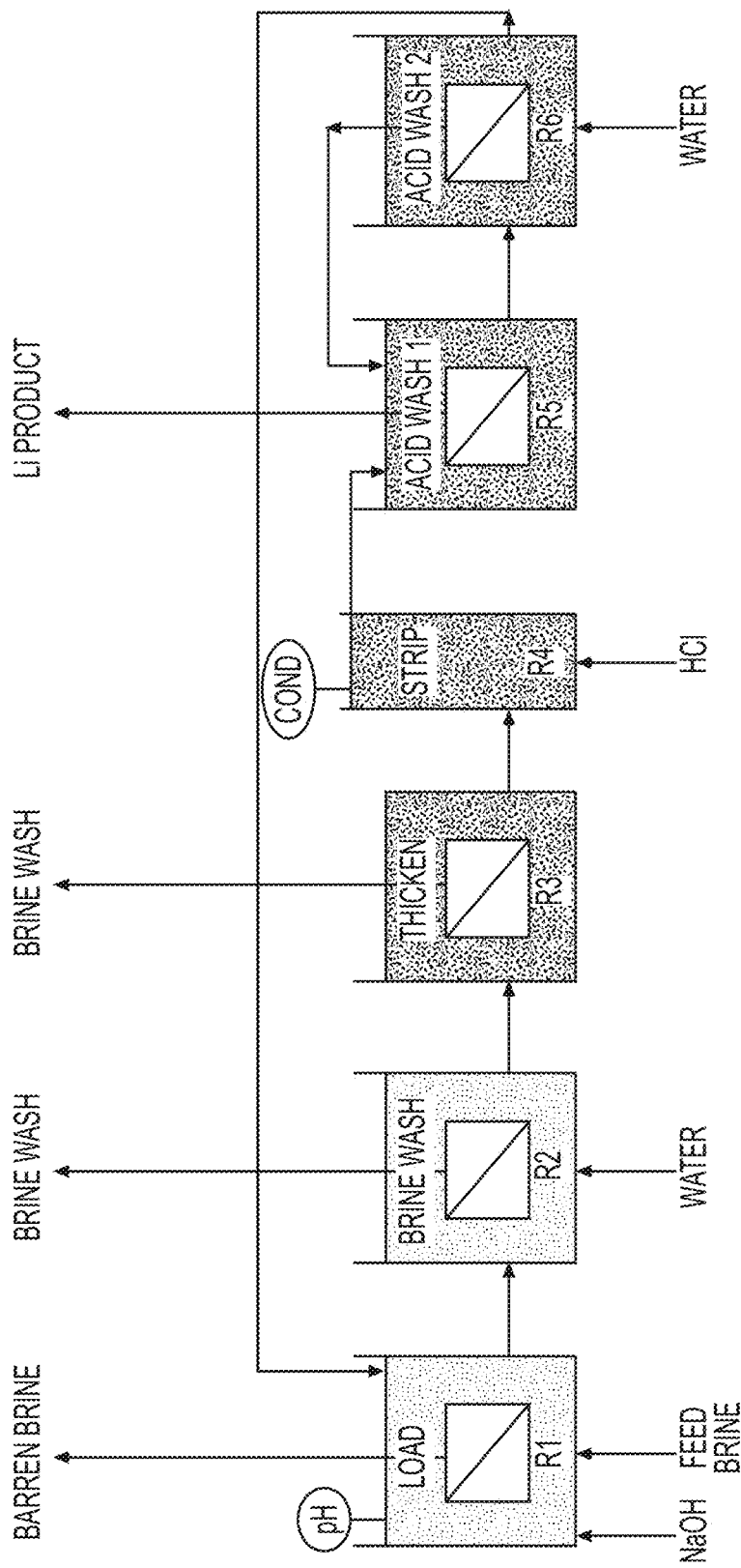
FIG. 5 is a diagrammatic view of an alternative lithium extraction system for the present process.

A test unit was constructed to demonstrate the process according to one embodiment of the invention. A schematic drawing of the test unit is shown in FIG. 5.

The test unit consisted of six reactors (R1-R6), each one equipped with air agitation diffusers and five of which were equipped with immersed membrane modules. Reactor R4, utilized for acid regeneration of the lithium ion sieve, was not equipped with a membrane. The working volume of each of the reactors was approximately 5 liters with the exception of the reactor R4, which had a working volume of approximately 1.1 liter.

Lithium titanate (LTO) was used as the lithium ion sieve. The LTO was synthesized by reacting lithium hydroxide with titanium dioxide at a molar ratio of approximately 2.2:1 at a temperature of 700° C. for 4 hours. FIG. 4, discussed above, provides the particle size distribution of the LTO used in this example. The initial LTO produced from the synthesis was converted to metatitanic acid (HTO) by pickling the LTO in 0.2 N HCl for 16 hours and then washing the resulting HTO with water. Reactor R1 and reactor R2 were initially charged with 100 g/L aqueous slurries of the LIS, while the remaining reactors were initially charged with 500 g/L slurries of the LIS. The lithium ion sieve was conveyed from reactor to reactor as a slurry by peristaltic pumps. The flow rate of the lithium ion sieve slurries was adjusted so that the solids transfer rate was approximately 100 g/h on a dry weight basis.

The membrane modules were lab-scale immersed-type POREFLON™ units, manufactured by Sumitomo Electric Corporation, each having an effective membrane area of 0.1 m². Liquid was drawn through the membranes by vacuum using peristaltic pumps. The vacuum was maintained at less than 40 kPa.

The lithium containing brine was made up from brine obtained from the Smackover formation in southern Arkansas and had a composition as shown in Table 1 below. After extraction of lithium from the brine in accordance with the process, the brine was re-fortified with lithium chloride and recycled to the process. As a result, the lithium concentration in the feed brine was somewhat higher than the initial brine as received. The sodium and potassium concentrations were estimated based upon published brine assays.

TABLE 1

|  | TSS (g/L) | [Li] (mg/L) | [Ca] (mg/L) | [Na] (mg/L) | [K] (mg/L) | [Mg] (mg/L) | Flow (L/h) |
|---|---|---|---|---|---|---|---|
| Feed Brine |  | 244 | 22,000 | 43,000* | 1,384* | 2,170 | 4.96 |
| Barren Brine |  | 61 |  |  |  |  | 4.15 |
| Product |  | 4,300 | 1,400 | 9,770 |  | 76 | 0.54 |
| Dilute slurry | 100 |  |  |  |  |  | 1.02 |
| Conc. slurry | 500 |  |  |  |  |  | 0.21 |

*Estimated from published brine assay data.

Reactor R1, the loading reactor, was equipped with a pH controller that automatically controlled the addition of 1 N NaOH such that a pH of 7.8 was maintained. Thus, the acid generated by the ion exchange reaction was continually neutralized. Feed brine was introduced to reactor R1 and allowed to contact the HTO. The HTO was fed to reactor R1 from reactor R6 as a 500 g/L slurry. As a result of the mixing of the concentrated slurry from reactor R6 with the feed brine, the solids concentration of the lithium ion sieve in reactor R1 was about 100 g/L. As the HTO extracted lithium ions from the brine, the HTO was partially converted back to LTO. Lithium-depleted (i.e., barren) brine was drawn through the membranes by a pump.

The loaded lithium ion sieve (i.e., LTO) was withdrawn from the reactor R1 as a brine slurry and directed to reactor R2, which was the brine wash reactor. Water was fed to reactor R2 so that the residual brine was washed from the LTO. The wash water was withdrawn from reactor R2 through another immersed membrane module.

Loaded/washed LIS was withdrawn from reactor R2 as a water slurry and directed to reactor R3, which was the thickener reactor. Water was withdrawn from reactor R3 through another immersed membrane module, thus increasing the solids concentration in reactor R3 to approximately 500 g/L.

The thickened slurry of loaded/washed LIS at a solids concentration of about 500 g/L was withdrawn from reactor R3 and directed to reactor R4, which was the regeneration reactor. The lithium ion sieve in reactor R4 was contacted with hydrochloric acid at a concentration of approximately 0.2 M. The lithium ion sieve solids concentration in reactor R4 was approximately 500 g/L. The acid concentration was monitored and maintained by a conductivity controller at a constant level through the addition of 5 M HCl to a conductivity set point of 150 mS/cm. Contacting the lithium ion sieve with acid converted it from the LTO form back to the HTO form and resulted in a lithium ion sieve slurry of about 0.2 M hydrochloric acid along with lithium chloride. Reactor R4 was not equipped with a membrane, and the lithium ion sieve slurry of HCl/lithium chloride was simply allowed to overflow to reactor R5. It is recognized that an acid concentration of 0.2 M is not preferred due to excessive dissolution of titanium from the LIS, but this example still illustrates the process of the present invention.

Reactor R5 was the first of two counter-currently operated acid wash reactors. The majority of the HCl/lithium chloride was washed from the lithium ion sieve in reactor R5, while most of the residual HCl/lithium chloride was washed from the lithium ion sieve in reactor R6. The lithium ion sieve in reactor R5, at a solids concentration of about 500 g/L, was contacted with wash-water from reactor R6. The acid wash-water was withdrawn from reactor R5 through another immersed membrane module. The acid wash-water withdrawn from reactor R5 constituted the recovered lithium chloride product from the process. A slurry of lithium ion sieve at a concentration of about 500 g/L was withdrawn from reactor R5 and directed to reactor R6.

Fresh water added to reactor R6 washed most of the remaining HCl/lithium chloride from the lithium ion sieve. The wash-water was withdrawn from reactor R6 through another immersed membrane module and directed to reactor R5. The concentration of lithium chloride in the wash-water in reactor R6 was thereby reduced to less than 10% of the lithium concentration in reactor R4. The lithium ion sieve/wash-water slurry was withdrawn from reactor R6 and directed back to reactor R1 wherein it was reused to extract lithium from the feed brine.

Figure 6:
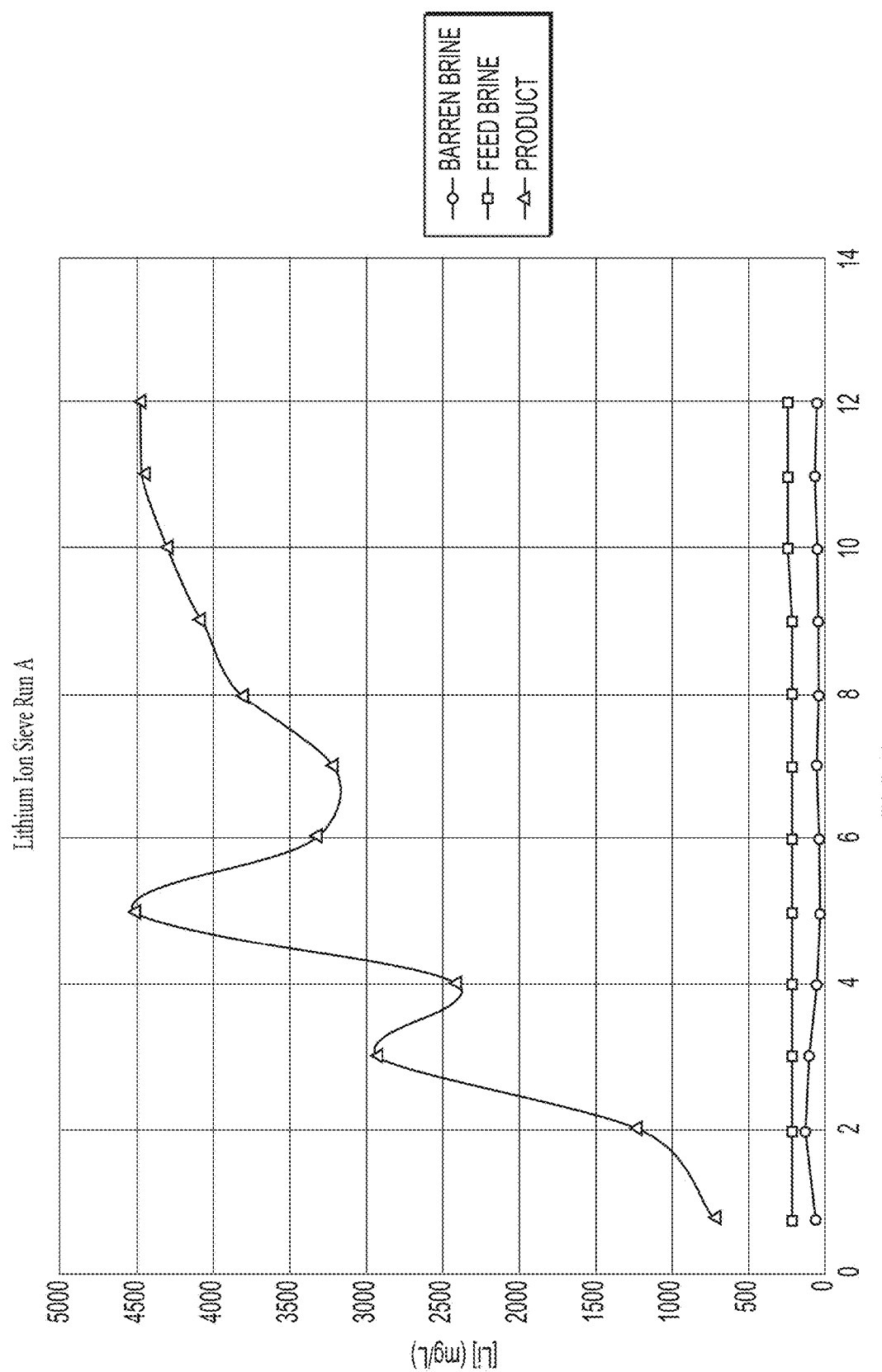
FIG. 6 is a graph of lithium concentration as a function of time for an exemplary extraction trial.

A continuous 12 hour test run was conducted. Aliquots of barren brine and product were sampled and assayed hourly. A graph showing the barren and product concentrations over the course of the run is shown in FIG. 6. The results summarized in Table 1 were from 1-hour composite samples taken after 10 hours of operation. The lithium concentration was reduced from 244 mg/L to 61 mg/L, a 75% recovery rate. The liquid residence time in the loading reactor was about 1 hour.

The lithium product contained a lithium concentration of 4,300 mg/L. More lithium was removed from the product (2,322 mg/h) than was actually extracted from the brine (957 mg/h). Without intending to be bound to any particular theory, it is believed that the difference (1,365 mg/h) was likely residual lithium on the lithium ion sieve that had not been completely removed from the LTO during the initial pickling in HCl. Based upon the lithium that was actually extracted from the brine, the lithium ion sieve capacity was 9.6 mg/g. The liquid residence time in the strip reactor was 2.2 hours. Based upon the lithium that was loaded and recovered, the lithium concentration factor was about 10 times.

The feed brine contained a calcium concentration of 22,000 mg/L while the product contained a calcium concentration of only 1,400 mg/L. The ratio of calcium to lithium in the feed was 90. The ratio in the product was 0.33. However, only about half of the lithium in the product was actually extracted from the brine. If only the lithium in the product that was extracted from the brine is considered, the ratio of Ca to Li in the product was 0.62, which represents an enrichment factor of 90/0.62=145.

The feed brine contained an estimated sodium concentration of 43,000 mg/L while the product contained a sodium concentration of only 9,770 mg/L. The ratio of sodium to lithium in the feed was 176. The ratio in the product was 2.3. If only the lithium in the product that was extracted from the brine is considered, the ratio of Na to Li in the product was 4.3, which represents an enrichment factor of 176/4.3=41.

The feed brine contained a magnesium concentration of 2,170 mg/L while the product contained a magnesium concentration of only 76 mg/L. The ratio of magnesium to lithium in the feed was 8.9. The ratio in the product was 0.018. If only the lithium in the product that was extracted from the brine is considered, the ratio of Mg to Li in the product was 0.034, which represents an enrichment factor of 8.9/.034=262.

Thus, the system and method described herein have the ability to selectively recover lithium from brines containing high concentrations of calcium, sodium, and magnesium.

In this example, only one brine wash reactor was used, so some brine would have passed into the regeneration reactor on the loaded lithium ion sieve, thus carrying some calcium, sodium, and/or magnesium into the regeneration reactor on the loaded lithium ion sieve. Without intending to be bound to any particular theory, it is believed that the results could be improved by including a second brine washing reactor. In addition, as discussed above, by lowering the loading pH to 6-7, the amount of sodium loaded onto the lithium ion sieve could be reduced without appreciably decreasing the lithium capacity.

COMPARATIVE EXAMPLE

A key test was done in Chitrakar to evaluate the effect of HCl concentration on initial extraction of lithium and titanium from the adsorbent, which is shown in FIG. 4a of Chitrakar. FIG. 4a of Chitrakar shows the amount of lithium and titanium extracted as a function of the HCl concentration. The data in Chitrakar shows that the HCl concentration should be 0.2 M or more. In fact, no data is shown in FIG. 4a of Chitrakar for lithium extraction from the adsorbent below an acid concentration of 0.1 M, which is the preferred acid concentration in which the present invention operates. In the present invention, the lithium and titanium components of the LTO adsorbent are extracted at much lower acid concentrations than predicted by Chitrakar.

References herein to terms such as "vertical," "horizontal," etc. are made by way of example, and not by way of limitation, to establish a frame of reference. It is understood that various other frames of reference may be employed for describing the invention without departing from the spirit and scope of the invention. It is also understood that features of the invention are not necessarily shown to scale in the drawings. Furthermore, to the extent that the terms "composed of," "includes," "having," "has," "with," or variants thereof are used in either the detailed description or the claims, such terms are intended to be inclusive and open-ended in a manner similar to the term "comprising."

References herein to terms modified by language of approximation, such as "about," "approximately," and "substantially," are not to be limited to the precise value specified. The language of approximation may correspond to the precision of an instrument used to measure the value and, unless otherwise dependent on the precision of the instrument, may indicate +/−10% of the stated value(s).

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In the interest of fully enabling persons ordinarily skilled in the art to make and use the claimed invention, the applicant has provided information as to both advantages and disadvantages of various detailed embodiments. Persons of ordinary skill will understand that, in some applications, the disadvantages of a specific embodiment as detailed above may be avoided altogether or outweighed by the overall advantages provided by the invention as claimed. Accordingly, departures may be made from detailed teachings above without departing from the spirit or scope of applicant's general inventive concept.

The invention claimed is:

1. A process for recovery of lithium ions from a lithium-bearing brine, the process comprising:
    contacting the lithium-bearing brine with a lithium ion sieve for less than about one hour in a first reactor to form a lithium ion complex with the lithium ion sieve;
    separating the lithium ion complex with the lithium ion sieve from the brine with a solid/liquid separation device;
    contacting the lithium ion complex with the lithium ion sieve with water before decomplexing in a second reactor; and
    decomplexing lithium ions from the lithium ion sieve in the second reactor to form an acidic lithium salt eluate solution separated from the lithium ion sieve;
    separating the lithium ion sieve from the acidic lithium salt eluate solution with a solid/liquid separation device; and
    contacting the lithium ion sieve with water after decomplexing in the second reactor to obtain a regenerated lithium ion sieve and a dilute acid water wash;
    wherein the lithium ion sieve comprises an oxide of titanium or niobium;
    wherein a pH of the first reactor is maintained at a constant value through addition of an alkali;
    wherein the decomplexing is performed by elution using an acid;
    wherein an average contact time of the lithium ion complex with the lithium ion sieve and the acid is less than 1 hour;
    wherein a concentration of the acid is maintained at a constant value through additions of said acid; and
    wherein the concentration of the acid is less than 0.1 M.

2. The process of claim 1, wherein the pH of the acid is greater than 1 and less than 3.

3. The process of claim 1, wherein the pH of the acid is approximately 2.

4. The process of claim 1, wherein the pH is maintained at the constant value of greater than 4 and less than 9.

5. The process of claim 1, wherein the pH in the first reactor is greater than 6 and less than 8.

6. The process of claim 1, wherein more than 90% of the lithium ion sieves have an average particle diameter of less than 40 μm and more than 90% of the lithium ion sieves have an average particle diameter of greater than 0.4 μm.

7. The process of claim 6, further comprising removing lithium ion sieves having an average particle diameter of less than 1 μm before contacting the lithium-bearing brine with the lithium ion sieve.

8. The process of claim 1, wherein more than 90% by volume of particles of the lithium ion sieve are less than 100 μm in diameter and greater than 0.5 μm in diameter.

9. The process of claim 1, wherein more than 90% by volume of particles of the lithium ion sieve are greater than 0.5 μm in diameter.

10. The process of claim 1, wherein the lithium ion sieve comprises metatitanic acid.

11. The process of claim 1, further comprising:
    adding the regenerated lithium ion sieve to the first reactor.

12. The process of claim 11, further comprising adding the dilute acid water wash and additional concentrated acid to the second reactor.

13. The process of claim 11, further comprising dewatering the lithium ion complex with the lithium ion sieve to a moisture content of less than 90% by weight before decomplexing the lithium ion from the lithium ion sieve in the second reactor.

14. The process of claim 11, further comprising dewatering the regenerated lithium ion sieve before being added to the first reactor.

15. The process of claim 11, wherein contacting the lithium ion sieve with water comprises contacting the lithium ion sieve with sufficient water such that more than 50% of the lithium ion that has been decomplexed from the lithium ion sieve is washed from the lithium ion sieve prior to adding the regenerated lithium ion sieve to the first reactor.

16. The process of claim 15, wherein contacting the lithium ion sieve with water comprises contacting the lithium ion sieve with water in more than one counter-current stage such that more than 50% of the lithium ion that has been decomplexed from the lithium ion sieve is washed from the lithium ion sieve prior to adding the regenerated lithium ion sieve to the first stirred reactor.

17. The process of claim 1, wherein the first reactor comprises ultrafiltration or microfiltration membranes.

18. The process of claim 17, wherein air is used to agitate contents of the first reactor.

19. The process of claim 17, wherein a flux rate through the ultrafiltration membrane or the microfiltration membrane is greater than 30 LMH at transmembrane pressures of less than 30 kPa.

20. The process of claim 1, wherein a concentration of the lithium ion sieve is greater than 50 g/L.

21. The process of claim 1, wherein the alkali comprises sodium hydroxide, ammonium hydroxide, anhydrous ammonia, potassium hydroxide, sodium carbonate, magnesium hydroxide, or calcium hydroxide.

22. The process of claim 1, wherein the acid comprises hydrochloric acid or sulfuric acid.

23. The process of claim 1, wherein a concentration of the lithium ion sieve is greater than 100 g/L.

24. The process of claim 1, wherein the alkali comprises anhydrous ammonia or ammonium hydroxide.

* * * * *